(12) United States Patent
Yang (10) Patent No.: US 7,066,727 B2
(45) Date of Patent: Jun. 27, 2006

(54) MOLDING DEVICE FOR FORMING A PLASTIC ARTICLE HAVING TWO COLORS

(76) Inventor: Teng-Jen Yang, No. 13, Alley 2, Lane 67, Ji Fen Rd., Wu Feng Hsiang, Taichung Hsien (TW)

( * ) Notice: Subject to any disclaimer, the term of this patent is extended or adjusted under 35 U.S.C. 154(b) by 0 days.

(21) Appl. No.: 11/083,487

(22) Filed: Mar. 18, 2005

(65) Prior Publication Data

US 2005/0163883 A1    Jul. 28, 2005

Related U.S. Application Data

(62) Division of application No. 10/281,257, filed on Oct. 28, 2002.

(51) Int. Cl.
*B29C 45/64*    (2006.01)

(52) U.S. Cl. .................. 425/570; 264/255; 425/574

(58) Field of Classification Search ............... 425/574, 425/575, 576, 570; 264/255, 328.12
See application file for complete search history.

(56) References Cited

U.S. PATENT DOCUMENTS

| 6,042,364 | A * | 3/2000 | Nishida | 425/574 |
| 6,365,083 | B1 * | 4/2002 | Nishida | 264/255 |
| 6,579,485 | B1 * | 6/2003 | Smith et al. | 264/255 |

* cited by examiner

*Primary Examiner*—Tim Heitbrink
(74) *Attorney, Agent, or Firm*—Charles E. Baxley (57) ABSTRACT

The present invention relates to a molding device for forming a plastic article having two colors. The method for forming a plastic article having two colors uses two female dies whose positions are changed in a reciprocal manner to mate with a die, so that two plastic materials having two different colors are in turn formed on the two female dies by a plastic injection molding process, thereby forming a plastic article having two colors.

12 Claims, 10 Drawing Sheets

MOLDING DEVICE FOR FORMING A PLASTIC ARTICLE HAVING TWO COLORS

This application is a division of application Ser. No. 10/281,257 filed Oct. 28, 2002.

1. FIELD OF THE INVENTION

The present invention relates to a molding device for forming a plastic article having two colors a, wherein the positions of the shorter female die and the longer female die of the mold set are successively changed in a linear and reciprocal manner, thereby shortening the stroke of operation, and thereby saving the energy of operation.

2. DESCRIPTION OF THE RELATED ART

A conventional molding device for forming a plastic article having two colors in accordance with the prior art comprises a plurality of rotation dies that are rotated by a power device, so that the plastic materials having two different colors are in turn injected into each of the rotation dies to make a plastic article having two colors. However, the conventional molding device needs a larger working space and forming equipment. In addition, the conventional molding device consumes the power and energy largely. Further, the conventional molding device needs a longer working time.

SUMMARY OF THE INVENTION

The primary objective of the present invention is to provide a molding device for forming a plastic article having two colors, wherein the positions of the shorter female die and the longer female die of the mold set are successively changed in a linear and reciprocal manner, so that the molding device only needs to provide fewer parts to produce the plastic article having two colors, thereby shortening the working time, reducing the receiving space of the equipment, and thereby decreasing cost of fabrication.

Another objective of the present invention is to provide a molding device for forming a plastic article having two colors, wherein the user only needs to replace the mold set having a different size so as to the plastic article having two colors with a different size, thereby enhancing the versatility of the present invention.

A further objective of the present invention is to provide a molding device for forming a plastic article having two colors, wherein the positions of the shorter female die and the longer female die of the mold set are successively changed in a linear and reciprocal manner, thereby shortening the stroke of operation, and thereby saving the energy of operation.

Further benefits and advantages of the present invention will become apparent after a careful reading of the detailed description with appropriate reference to the accompanying drawings.

DETAILED DESCRIPTION OF THE INVENTION

Figure 1:
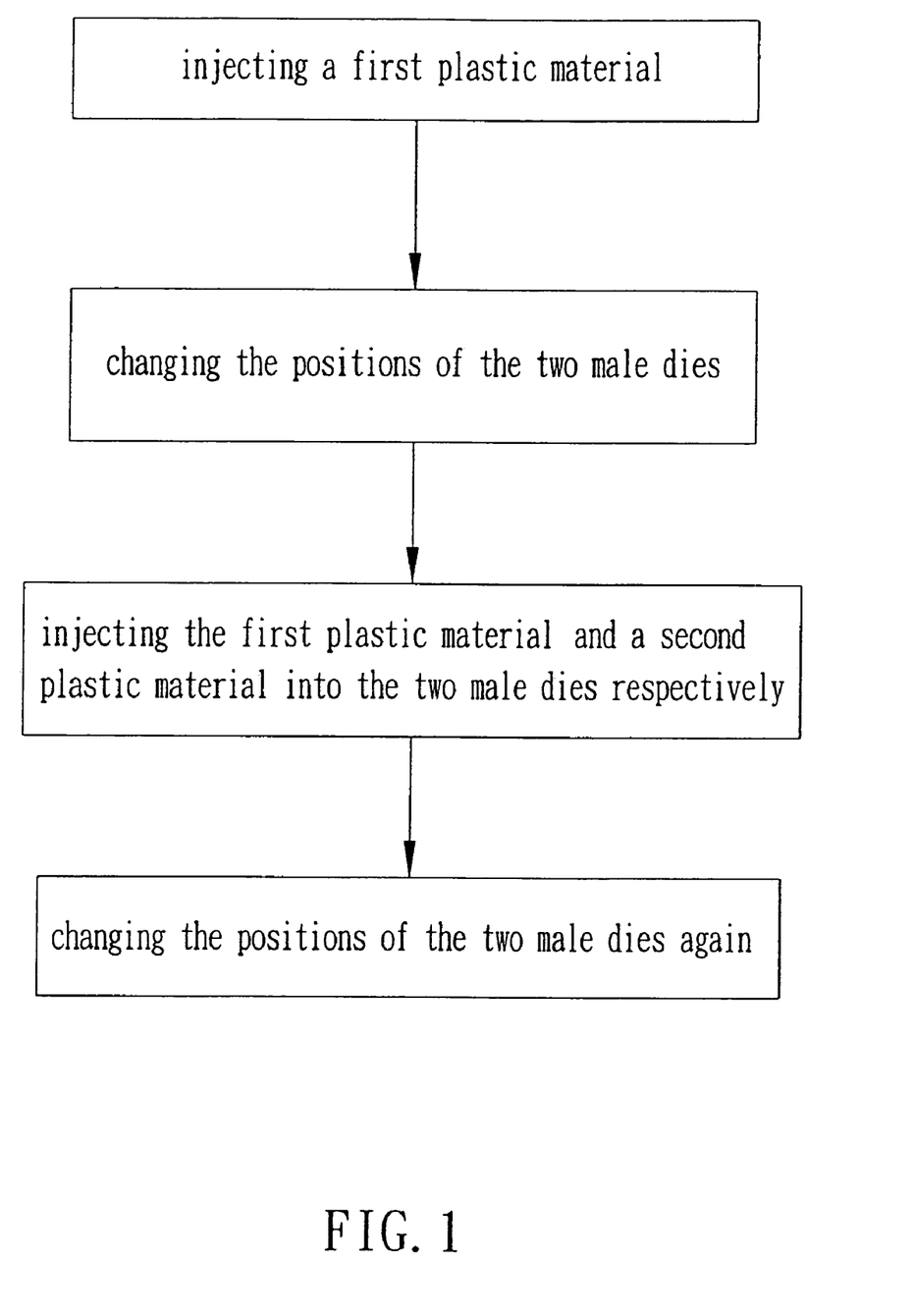
FIG. 1 is a flow chart of a method for forming a plastic article having two colors in accordance with a preferred embodiment of the present invention.
Figure 2:
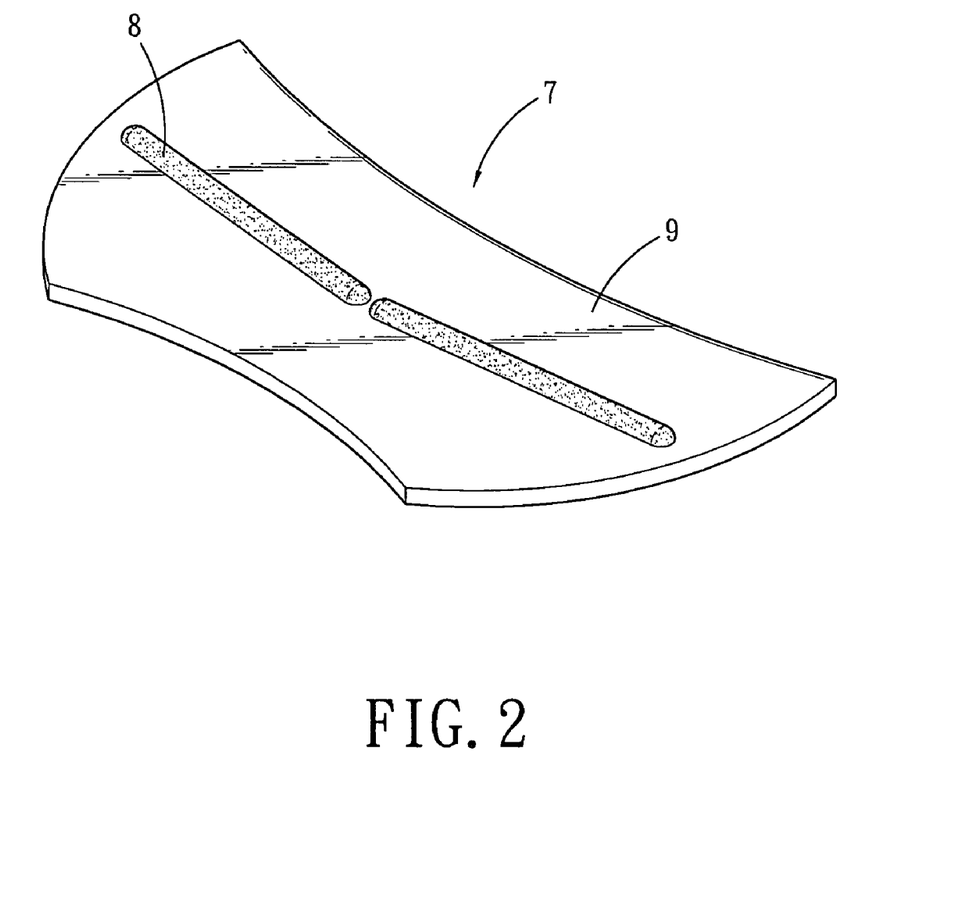
FIG. 2 is a perspective view of a plastic article having two colors in accordance with the preferred embodiment of the present invention.

Referring to the drawings and initially to FIGS. 1 and 2, a method for forming a plastic article 7 having two colors in accordance with a preferred embodiment of the present invention uses two female dies whose positions are changed in a reciprocal manner to mate with a female die, so that two plastic materials having two different colors are in turn formed on the two female dies by a plastic injection molding process, thereby forming a plastic article having two colors.

The method for forming a plastic article 7 having two colors in accordance with the preferred embodiment of the present invention comprises the steps of: (a) injecting a first plastic material; (b) changing the positions of the two female dies; (c) injecting the first plastic material and a second plastic material into the two female dies respectively; and (d) changing the positions of the two female dies again.

The procedures of the method for forming a plastic article 7 having two colors in accordance with a preferred embodiment of the present invention are described as follows.

First of all, a first female die and a second female die are provided.

Subsequently, a first plastic material 8 having a first color is injected into the first female die by a plastic injection molding process. Then, a die is pressed on the first female die, so as to form the first plastic material 8 on the first female die.

Subsequently, the first female die and the second female die are arranged in a staggered manner along the vertical direction. Then, the first female die and the second female die are displaced in a parallel and linear manner, so that the positions of the first female die and the second female die are changed.

Subsequently, the first plastic material 8 having the first color is injected into the second female die by a plastic injection molding process, and a second plastic material 9 having a second color is injected into the first female die by a plastic injection molding process. Then, the die is pressed on the first female die and the second female die, so as to form the first plastic material 8 on the second female die and to form the second plastic material 9 on the first female die, so that the first female die forms a plastic article 7 containing the first plastic material 8 and the second plastic material 9.

Subsequently, the first female die and the second female die are arranged in a staggered manner along the vertical direction. Then, the first female die and the second female die are displaced in a parallel and linear manner, so that the positions of the first female die and the second female die are changed. Then, the plastic article 7 on the first female die is removed. Then, the first plastic material 8 having the first color is injected into the first female die by a plastic injection molding process, and the second plastic material 9 having the second color is injected into the second female die by a plastic injection molding process. Then, the die is pressed on the first female die and the second female die, so as to form the first plastic material 8 on the first female die and to form the second plastic material 9 on the second female die, so that the second female die forms a plastic article 7 containing the first plastic material 8 and the second plastic material 9.

The above-mentioned procedures are repeated successively, so as to produce multiple plastic articles 7 each containing the first plastic material 8 and the second plastic material 9, so that each of the plastic articles 7 has two colors.

Figure 3:
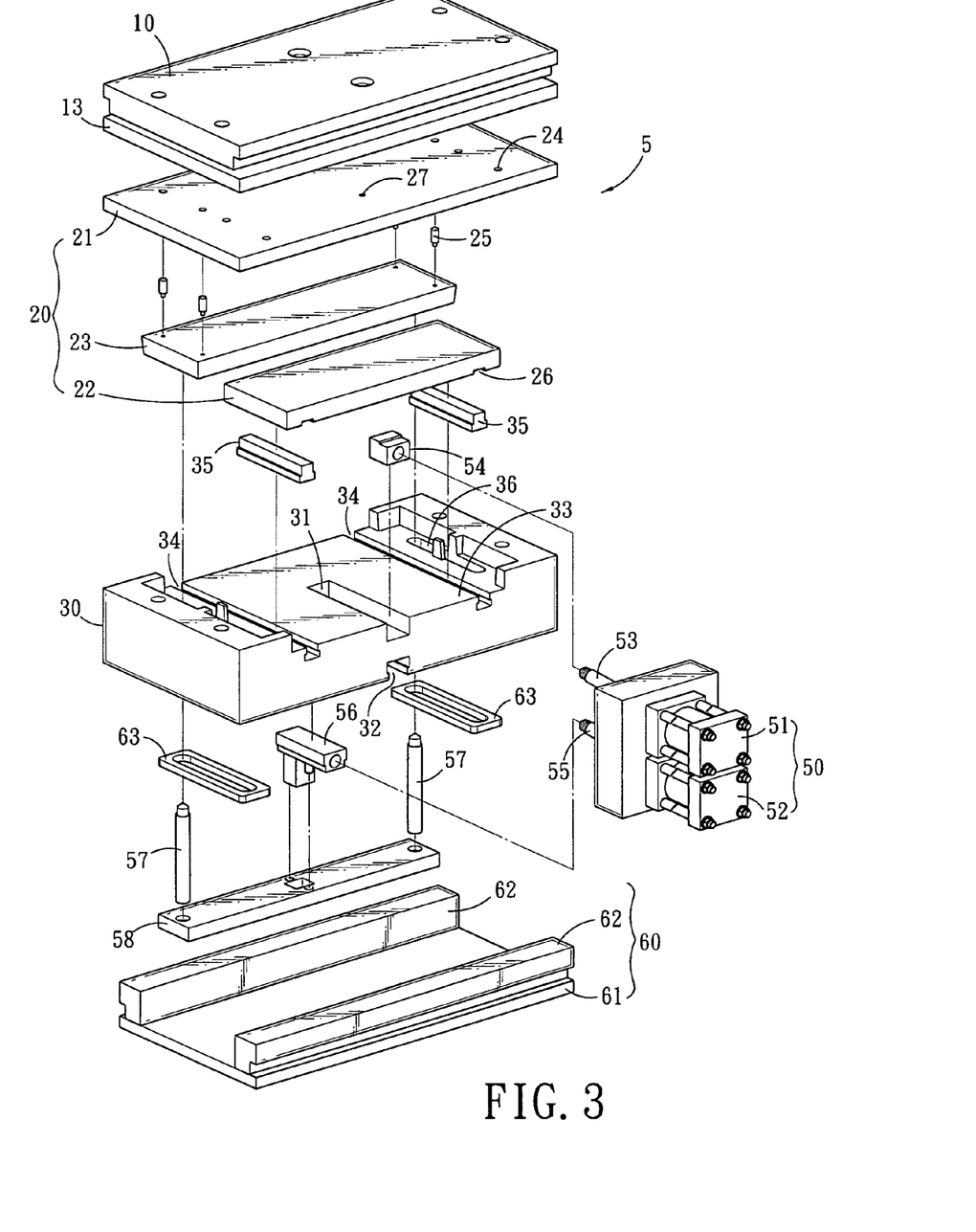
FIG. 3 is an exploded perspective view of a molding device for forming a plastic article having two colors in accordance with the preferred embodiment of the present invention.
Figure 4:
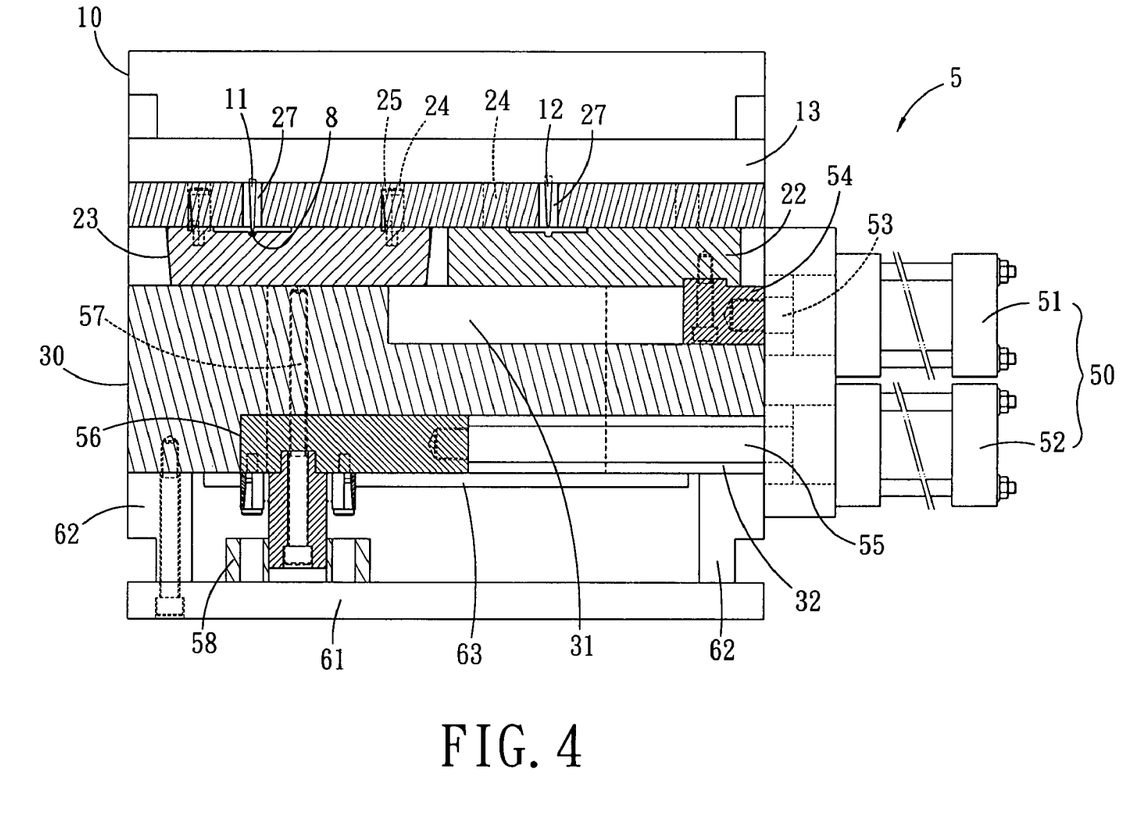
FIG. 4 is a side plan cross-sectional assembly view of the molding device as shown in FIG. 3.

Referring to FIGS. 3 and 4, a molding device 5 for forming a plastic article having two colors in accordance with a preferred embodiment of the present invention comprises a base set 60, a female molding board 30, a power set 50, a mold set 20 and a press board 10.

The base set 60 includes a base plate 61, two support seats 62, and two auxiliary plates 63. The two support seats 62 of the base set 60 are mounted on two opposite lengthwise longer ends of the base plate 61. The two auxiliary plates 63 of the base set 60 are mounted on two opposite crosswise shorter ends of the base plate 61, and are located between the two support seats 62 of the base set 60.

The female molding board 30 is mounted on the two support seats 62 of the base set 60, and has a first side formed with a concave 33 and a first slideway 31 and a second side formed with a second slideway 32. The female molding board 30 has two opposite ends each formed with an inner channel 34 and an outer channel 36. The female molding board 30 includes two slide blocks 35 each slidably mounted in the inner channel 34.

The power set 50 is mounted on the female molding board 30, and includes a first movable assembly 51 and a second movable assembly 52.

The first movable assembly 51 of the power set 50 includes a first movable rod 53 and a first slide seat 54. The first slide seat 54 of the first movable assembly 51 of the power set 50 is mounted on a front end of the first movable rod 53 to move therewith, and is slidably mounted in the first slideway 31 of the female molding board 30.

The second movable assembly 52 of the power set 50 includes a second movable rod 55, a second slide seat 56, a carrying seat 58, and two push rods 57. The second slide seat 56 of the second movable assembly 52 of the power set 50 is mounted on a front end of the second movable rod 55 to move therewith, and is slidably mounted in the second slideway 32 of the female molding board 30. The carrying seat 58 of the second movable assembly 52 of the power set 50 is mounted on the second slide seat 56 to move therewith. Each of the two push rods 57 of the second movable assembly 52 of the power set 50 is mounted on one of two ends of the carrying seat 58 to move with the carrying seat 58. Each of the two push rods 57 of the second movable assembly 52 of the power set 50 is extended through a respective one of the two auxiliary plates 63 of the base set 60, and is extended through the outer channel 36 of the female molding board 30.

The mold set 20 includes a shorter female die 22, a longer female die 23, and a die 21.

The shorter female die 22 of the mold set 20 is mounted in the concave 33 of the female molding board 30, and has a bottom formed with two locking grooves 26 each secured on a respective one of the two slide blocks 35 of the female molding board 30, so that the shorter female die 22 of the mold set 20 is moved with the two slide blocks 35 of the female molding board 30. The bottom of the shorter female die 22 of the mold set 20 is secured on the first slide seat 54 of the first movable assembly 51 of the power set 50, so that the shorter female die 22 of the mold set 20 is moved by the first slide seat 54 of the first movable assembly 51 of the power set 50.

The longer female die 23 of the mold set 20 having a length greater than that of the shorter female die 22 is mounted in the concave 33 of the female molding board 30, and has a bottom having two opposite ends each secured on a respective one of the two push rods 57 of the second movable assembly 52 of the power set 50, so that the longer female die 23 of the mold set 20 is moved with the two push rods 57 of the second movable assembly 52 of the power set 50. The longer female die 23 of the mold set 20 has a top screwed with a plurality of positioning bolts 25.

The die 21 of the mold set 20 is movable relative to the female molding board 30, and is formed with two injection holes 27 and a plurality of positioning holes 24. Each of the plurality of positioning bolts 25 of the longer female die 23 of the mold set 20 may be inserted into a respective one of the plurality of positioning holes 24 of the die 21 of the mold set 20.

The press board 10 is mounted on the die 21 of the mold set 20, and has a bottom provided with a releasing plate 13. The press board 10 has an inside formed with a first injection nozzle 11 passed through one of the two injection holes 27 of the die 21 of the mold set 20 for injecting the first plastic material 8, and a second injection nozzle 12 passed through the other one of the two injection holes 27 of the die 21 of the mold set 20 for injecting the second plastic material 9.

In operation, referring to FIG. 4, the press board 10 is pressed on the die 21 of the mold set 20, so that the mold set 20 presents a closed state. At this time, the first injection nozzle 11 of the press board 10 is passed through one of the two injection holes 27 of the die 21 of the mold set 20 for injecting the first plastic material 8 into the longer female die 23 of the mold set 20, so that the longer female die 23 of the mold set 20 contains the first plastic material 8 and forms a plastic substrate having a single color.

Figure 5:
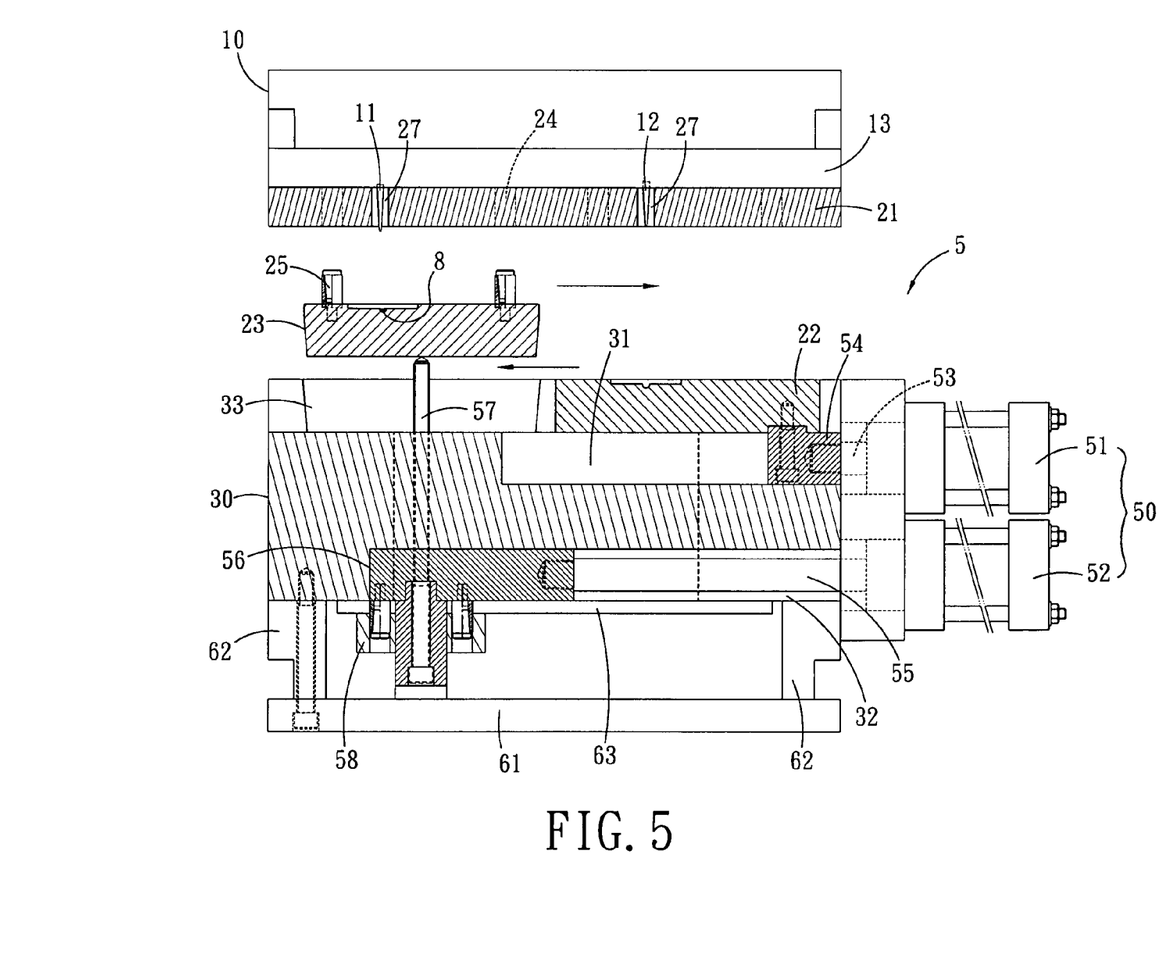
FIG. 5 is a schematic operational view of the molding device as shown in FIG. 4.
Figure 6:
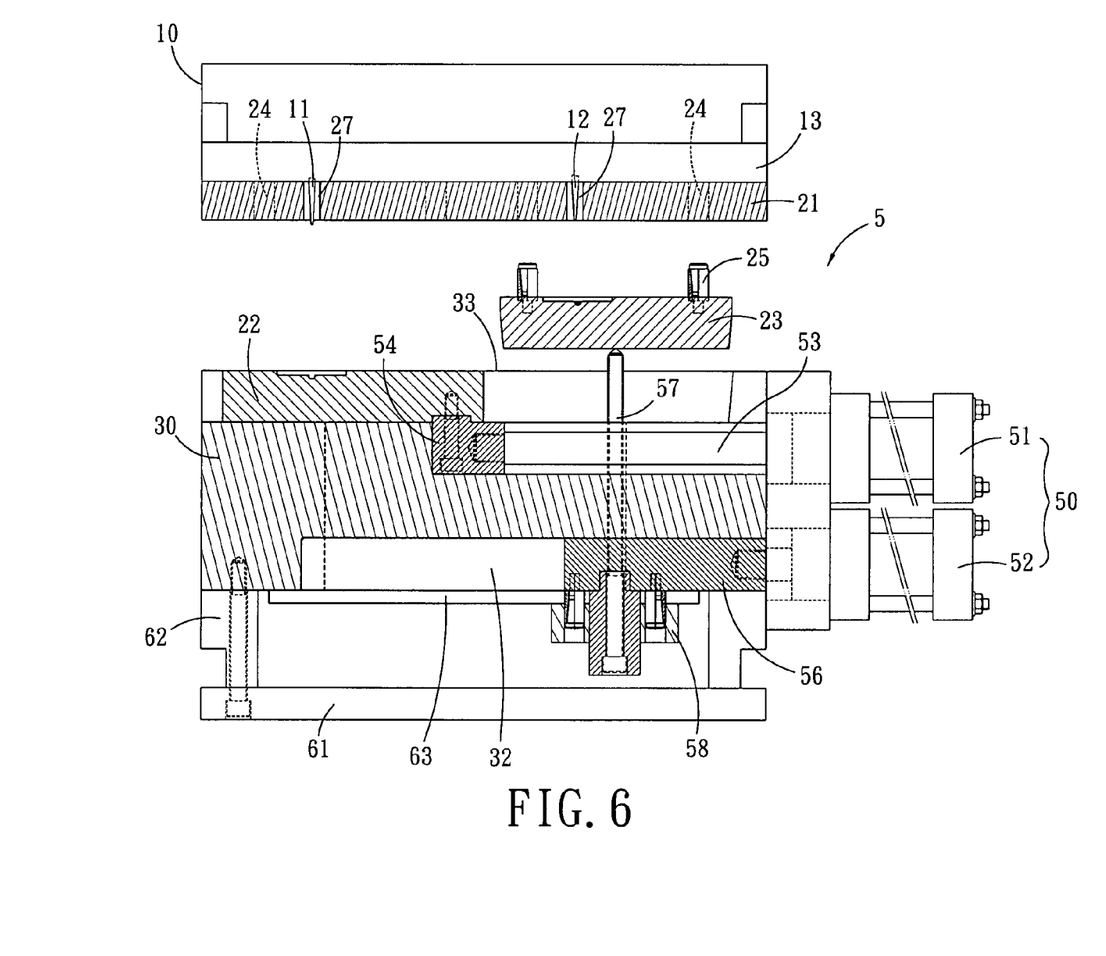
FIG. 6 is a schematic operational view of the molding device as shown in FIG. 5.

Referring to FIGS. 5 and 6, the press board 10 and the die 21 of the mold set 20 are lifted, so that the mold set 20 presents an opened state. Then, the two push rods 57 of the second movable assembly 52 of the power set 50 are extended upward to lift the longer female die 23 of the mold set 20, to detach the longer female die 23 of the mold set 20 from the concave 33 of the female molding board 30. Then, the second movable rod 55 of the second movable assembly 52 of the power set 50 is retracted inward, to move the second slide seat 56 of the second movable assembly 52 of the power set 50 in the second slideway 32 of the female molding board 30, so as to move the carrying seat 58 which moves the two push rods 57 in the outer channel 36 of the female molding board 30, so that the longer female die 23 of the mold set 20 is moved from the position as shown in FIG. 5 to the position as shown in FIG. 6.

At the same time, the first movable rod 53 of the first movable assembly 51 of the power set 50 is extended outward to move the first slide seat 54 of the first movable assembly 51 of the power set 50 in the first slideway 31 of the female molding board 30, so that the shorter female die 22 of the mold set 20 is moved by the first slide seat 54 of the first movable assembly 51 of the power set 50, and the two slide blocks 35 of the female molding board 30 are moved in the inner channels 34 of the female molding board 30. Thus, the shorter female die 22 of the mold set 20 is moved from the position as shown in FIG. 5 to the position as shown in FIG. 6.

Thus, the positions of the shorter female die 22 and the longer female die 23 of the mold set 20 are changed in a linear manner.

Figure 7:
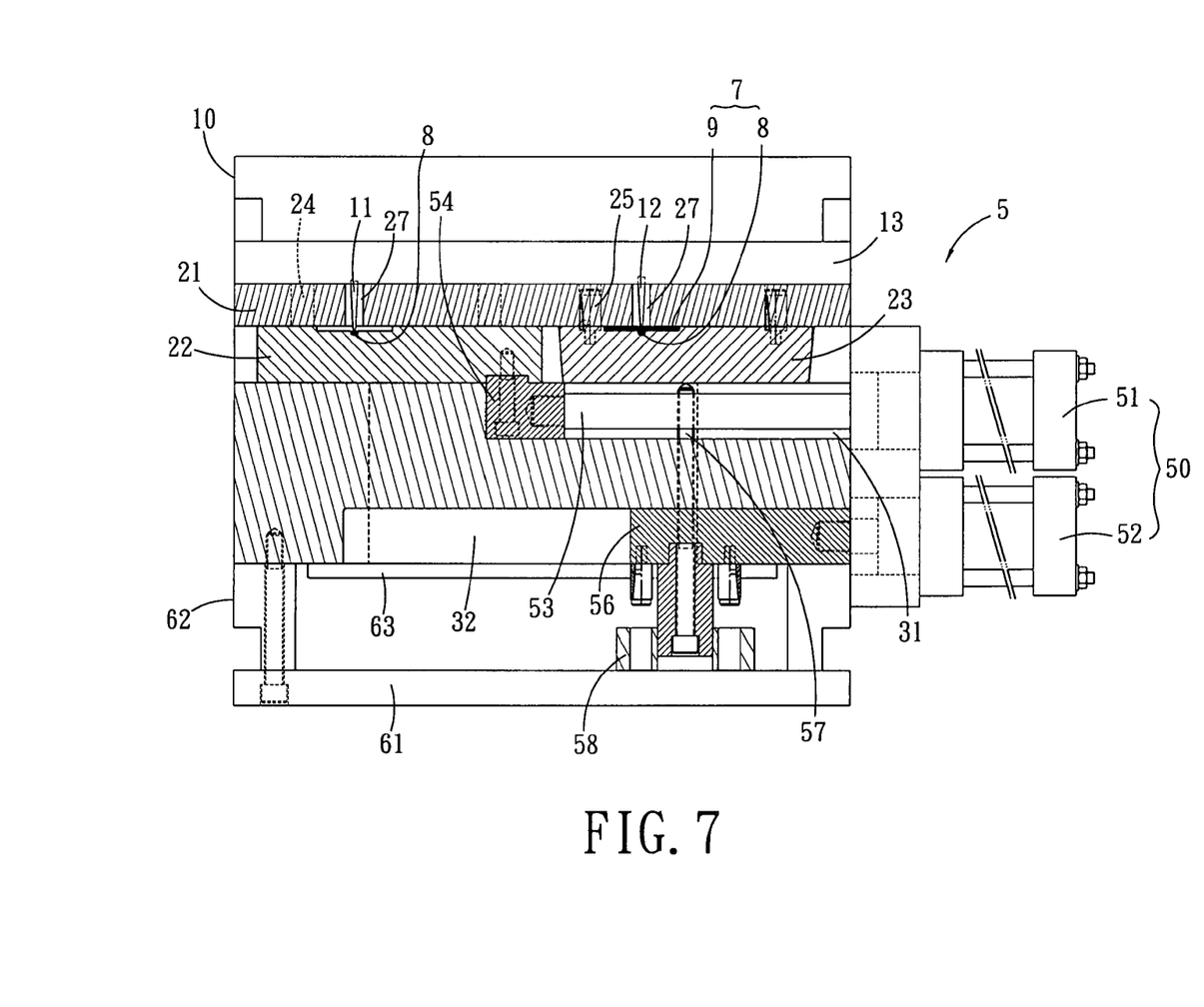
FIG. 7 is a schematic operational view of the molding device as shown in FIG. 6.

Referring to FIG. 7, the two push rods 57 of the second movable assembly 52 of the power set 50 are moved downward to lower the longer female die 23 of the mold set 20, so as to place the longer female die 23 of the mold set 20 into the concave 33 of the female molding board 30. Then, the press board 10 and the die 21 of the mold set 20 are lowered, so that the mold set 20 presents a closed state. Then, the first injection nozzle 11 of the press board 10 is passed through one of the two injection holes 27 of the die 21 of the mold set 20 for injecting the first plastic material 8 into the shorter female die 22 of the mold set 20, so that the shorter female die 22 of the mold set 20 contains the first plastic material 8 and forms a plastic substrate having a single color.

At the same time, the second injection nozzle 12 of the press board 10 is passed through the other one of the two injection holes 27 of the die 21 of the mold set 20 for injecting the second plastic material 9 into the longer female die 23 of the mold set 20, so that the longer female die 23 of the mold set 20 contains the first plastic material 8 and the second plastic material 9 and forms a plastic article 7 having two colors.

Figure 8:
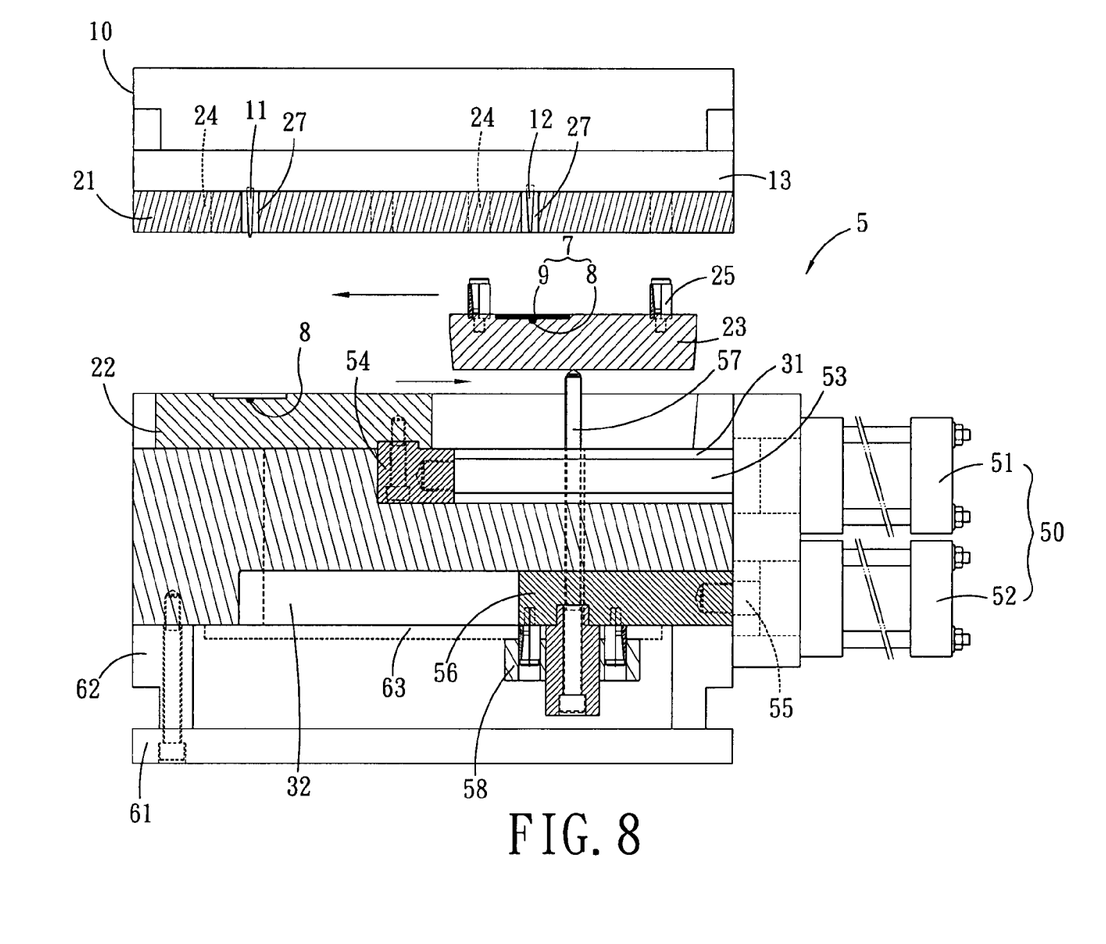
FIG. 8 is a schematic operational view of the molding device as shown in FIG. 7.
Figure 9:
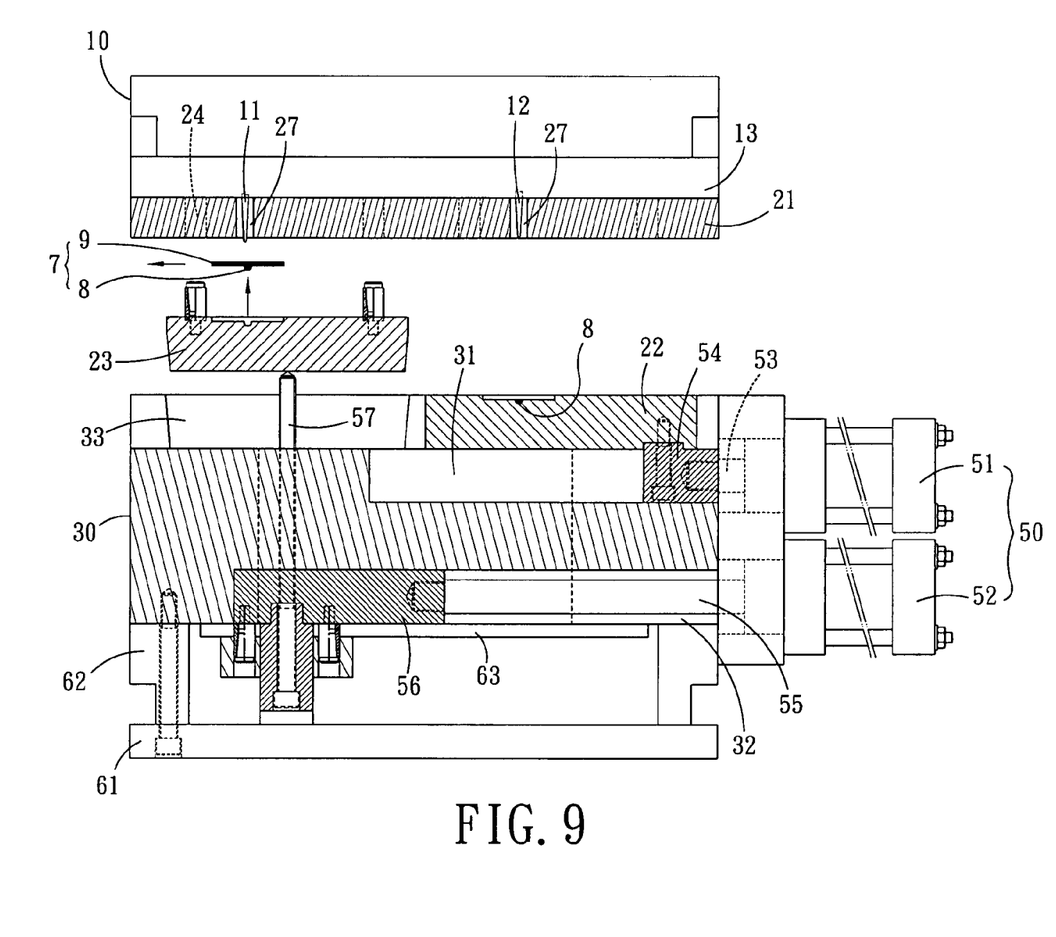
FIG. 9 is a schematic operational view of the molding device as shown in FIG. 8.

Referring to FIGS. 8 and 9, the press board 10 and the die 21 of the mold set 20 are lifted, so that the mold set 20 presents an opened state. Then, the two push rods 57 of the second movable assembly 52 of the power set 50 are extended upward to lift the longer female die 23 of the mold set 20, to detach the longer female die 23 of the mold set 20 from the concave 33 of the female molding board 30. Then, the second movable rod 55 of the second movable assembly 52 of the power set 50 is extended outward, to move the second slide seat 56 of the second movable assembly 52 of the power set 50 in the second slideway 32 of the female molding board 30, so as to move the carrying seat 58 which moves the two push rods 57 in the outer channel 36 of the female molding board 30, so that the longer female die 23 of the mold set 20 is moved from the position as shown in FIG. 8 to the position as shown in FIG. 9.

At the same time, the first movable rod 53 of the first movable assembly 51 of the power set 50 is retracted inward to move the first slide seat 54 of the first movable assembly 51 of the power set 50 in the first slideway 31 of the female molding board 30, so that the shorter female die 22 of the mold set 20 is moved by the first slide seat 54 of the first movable assembly 51 of the power set 50, and the two slide blocks 35 of the female molding board 30 are moved in the inner channels 34 of the female molding board 30. Thus, the shorter female die 22 of the mold set 20 is moved from the position as shown in FIG. 8 to the position as shown in FIG. 9.

Thus, the positions of the shorter female die 22 and the longer female die 23 of the mold set 20 are again changed in a linear manner.

Then, the plastic article 7 containing the first plastic material 8 and the second plastic material 9 is removed from the longer female die 23 of the mold set 20 by the releasing plate 13 of the press board 10.

Figure 10:
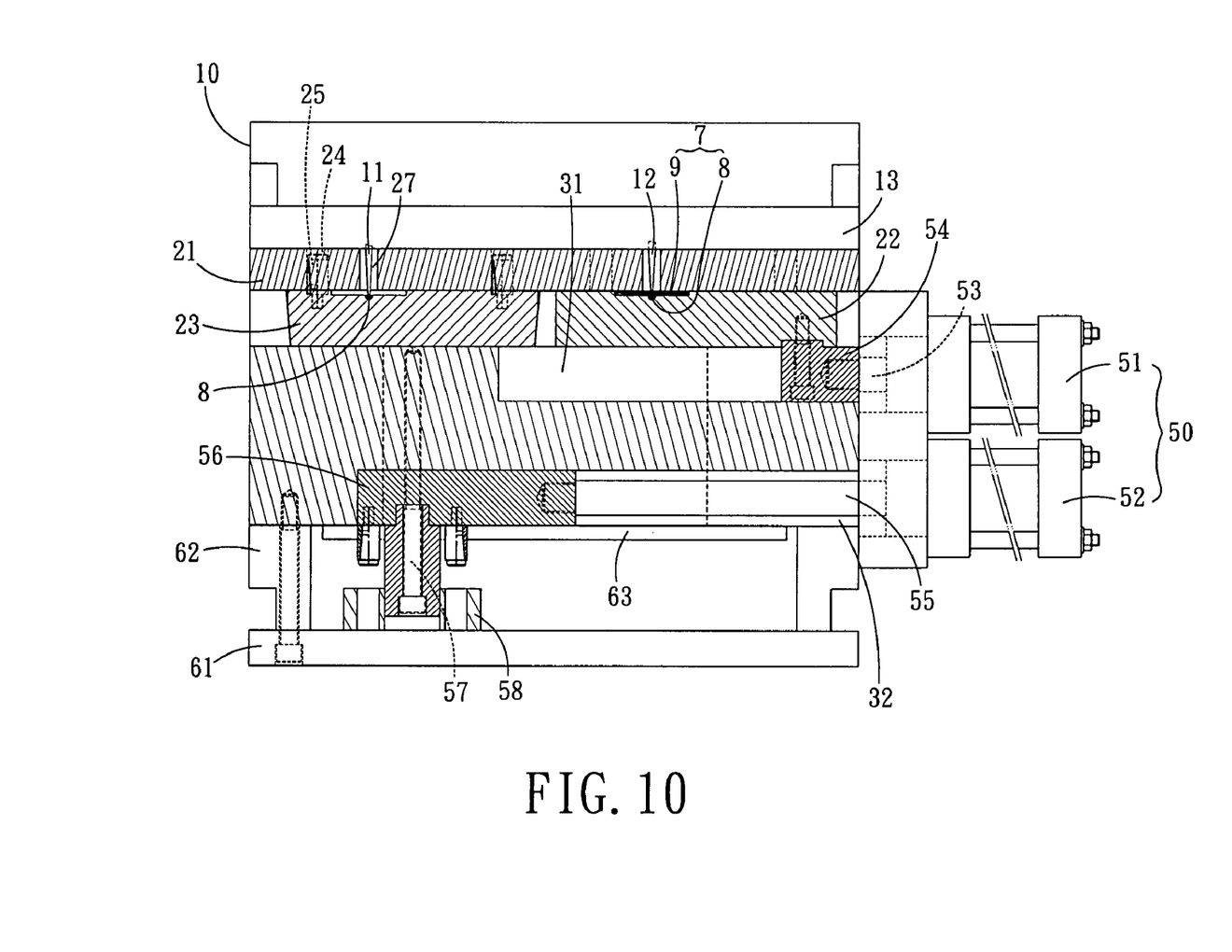
FIG. 10 is a schematic operational view of the molding device as shown in FIG. 9.

Referring to FIG. 10, after the plastic article 7 is removed from the longer female die 23 of the mold set 20, the two push rods 57 of the second movable assembly 52 of the power set 50 are moved downward to lower the longer female die 23 of the mold set 20, so as to place the longer female die 23 of the mold set 20 into the concave 33 of the female molding board 30. Then, the press board 10 and the die 21 of the mold set 20 are lowered, so that the mold set 20 presents a closed state. Then, the first injection nozzle 11 of the press board 10 is passed through one of the two injection holes 27 of the die 21 of the mold set 20 for injecting the first plastic material 8 into the longer female die 23 of the mold set 20, so that the longer female die 23 of the mold set 20 contains the first plastic material 8 and forms a plastic substrate having a single color.

At the same time, the second injection nozzle 12 of the press board 10 is passed through the other one of the two injection holes 27 of the die 21 of the mold set 20 for injecting the second plastic material 9 into the shorter female die 22 of the mold set 20, so that the shorter female die 22 of the mold set 20 contains the first plastic material 8 and the second plastic material 9 and forms a plastic article 7 having two colors.

Thus, the positions of the shorter female die 22 and the longer female die 23 of the mold set 20 are successively changed in a linear and reciprocal manner, thereby mass producing the plastic articles 7 having two colors in a successive manner.

Accordingly, the method for forming a plastic article having two colors and a molding device of the method in accordance with the present invention has the following advantages.

1. The positions of the shorter female die and the longer female die of the mold set are successively changed in a linear and reciprocal manner, so that the molding device only needs to provide fewer parts to produce the plastic article having two colors, thereby shortening the working time, reducing the receiving space of the equipment, and thereby decreasing cost of fabrication.

2. The user only needs to replace the mold set having a different size so as to the plastic article having two colors with a different size, thereby enhancing the versatility of the present invention.

3. The positions of the shorter female die and the longer female die of the mold set are successively changed in a linear and reciprocal manner, thereby shortening the stroke of operation, and thereby saving the energy of operation.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. A molding device for forming a plastic article having two colors, comprising a base set, a female molding board, a mold set, a power set, and a press board, wherein:
   the female molding board is mounted on the base set, and is formed with a concave;
   the mold set includes a shorter female die movably mounted in the concave of the female molding board, a longer female die movably mounted in the concave of the female molding board, and a die movable relative to the female molding board to press the shorter female die and the longer female die;
   the power set is mounted on the female molding board, and includes a first movable assembly to move the shorter female die of the mold set, and a second movable assembly to move the longer female die of the mold set; and the press board is mounted on the die of the mold set.

2. The molding device in accordance with claim 1, wherein the base set includes a base plate, two support seats, and two auxiliary plates, wherein:
   the two support seats of the base set are mounted on two opposite lengthwise longer ends of the base plate to support the female molding board; and
   the two auxiliary plates of the base set are mounted on two opposite crosswise shorter ends of the base plate and are located between the two support seats of the base set.

3. The molding device in accordance with claim 1, wherein the female molding board has two opposite ends each formed with an inner channel, the female molding board includes two slide blocks each slidably mounted in the inner channel, and the shorter female die of the mold set has a bottom formed with two locking grooves each secured on a respective one of the two slide blocks of the female molding board, so that the shorter female die of the mold set is moved with the two slide blocks of the female molding board.

4. The molding device in accordance with claim 1, wherein the longer female die of the mold set has a top screwed with a plurality of positioning bolts, and the die of the mold set is formed with a plurality of positioning holes for mounting a respective one of the plurality of positioning bolts of the longer female die of the mold set.

5. The molding device in accordance with claim 1, wherein the die of the mold set is formed with two injection holes, and the press board has an inside formed with a first injection nozzle passed through one of the two injection holes of the die of the mold set for injecting a first plastic material, and a second injection nozzle passed through the other one of the two injection holes of the die of the mold set for injecting a second plastic material.

6. The molding device in accordance with claim 1, wherein the press board has a bottom provided with a releasing plate.

7. The molding device in accordance with claim 1, wherein the first movable assembly of the power set includes a first movable rod and a first slide seat, and the first slide seat of the first movable assembly of the power set is mounted on a front end of the first movable rod to move therewith, and is secured on the bottom of the shorter female die of the mold set, so that the shorter female die of the mold set is moved by the first slide seat of the first movable assembly of the power set.

8. The molding device in accordance with claim 7, wherein the female molding board has a first side formed with a first slideway, and the first slide seat of the first movable assembly of the power set is slidably mounted in the first slideway of the female molding board.

9. The molding device in accordance with claim 1, wherein the second movable assembly of the power set includes a second movable rod, a second slide seat, a carrying seat, and two push rods, wherein:
   the second slide seat of the second movable assembly of the power set is mounted on a front end of the second movable rod to move therewith;
   the carrying seat of the second movable assembly of the power set is mounted on the second slide seat to move therewith; and
   each of the two push rods of the second movable assembly of the power set is mounted on one of two ends of the carrying seat to move with the carrying seat.

10. The molding device in accordance with claim 9, wherein the female molding board has a second side formed with a second slideway, and the second slide seat of the second movable assembly of the power set is slidably mounted in the second slideway of the female molding board.

11. The molding device in accordance with claim 9, wherein the female molding board has two opposite ends each formed with an outer channel, and each of the two push rods of the second movable assembly of the power set is extended through the outer channel of the female molding board.

12. The molding device in accordance with claim 9, wherein the longer female die of the mold set has a bottom having two opposite ends each secured on a respective one of the two push rods of the second movable assembly of the power set, so that the longer female die of the mold set is moved with the two push rods of the second movable assembly of the power set.

* * * * *